United States Patent
Mastrocola et al.

(10) Patent No.: US 10,427,665 B2
(45) Date of Patent: Oct. 1, 2019

(54) FORCE FEEDBACK FAULT DETECTION AND ACCOMMODATION FOR A MULTI-CHANNEL ELECTRIC BRAKE ACTUATOR CONTROLLER

(71) Applicant: Simmonds Precision Products, Inc., Vergennes, VT (US)

(72) Inventors: Naison E. Mastrocola, Goshen, CT (US); Michael Abbott, Shelburne, VT (US); Brian L. Richardson, Shelburne, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 330 days.

(21) Appl. No.: 15/075,956

(22) Filed: Mar. 21, 2016

(65) Prior Publication Data

US 2017/0267225 A1     Sep. 21, 2017

(51) Int. Cl.
  *B60T 17/22*    (2006.01)
  *B60T 8/17*     (2006.01)
  *B60T 8/32*     (2006.01)

(52) U.S. Cl.
  CPC .......... *B60T 17/221* (2013.01); *B60T 8/1703* (2013.01); *B60T 8/325* (2013.01); *B60T 2270/403* (2013.01)

(58) Field of Classification Search
  CPC ... B60T 17/221; B60T 8/1703; B60R 16/0232
  USPC .............................................. 701/29.2, 29.7
  See application file for complete search history.

(56) References Cited

U.S. PATENT DOCUMENTS

| | | |
|---|---|---|
| 9,205,560 B1 | 12/2015 | Edsinger et al. |
| 2007/0084682 A1 | 4/2007 | Griffith et al. |
| 2008/0154470 A1 | 6/2008 | Goranson et al. |
| 2013/0338896 A1 | 12/2013 | Baehrle-Miller et al. |
| 2015/0217748 A1* | 8/2015 | Chico .................. B60T 17/221 701/3 |
| 2017/0197606 A1* | 7/2017 | Kipp ..................... B60T 8/1703 |

FOREIGN PATENT DOCUMENTS

| | | |
|---|---|---|
| EP | 1686029 A1 | 8/2006 |
| EP | 2965962 A2 | 1/2016 |

OTHER PUBLICATIONS

Extended European Search Report for International Application No. 17161890.3 dated Sep. 27, 2017, 10 pages.

* cited by examiner

*Primary Examiner* — Isaac G Smith
(74) *Attorney, Agent, or Firm* — Cantor Colburn LLP (57) ABSTRACT

A method for fault detection and accommodation for a controller and actuator system is provided. The method includes receiving, from a controller, a flag at an actuator in response to an excitation voltage and current falling below a threshold value, engaging a sensor in the actuator in response to receiving the flag, receiving, using the sensor a first load cell signal and a second load cell signal in response to the sensor being engaged, determining how actuator is operating brake based on the received flag, first load cell signal, and second load cell signal, adjusting a state of the actuator based on the determination, and reporting the state of the actuator by transmitting a report signal to the controller.

3 Claims, 6 Drawing Sheets

FORCE FEEDBACK FAULT DETECTION AND ACCOMMODATION FOR A MULTI-CHANNEL ELECTRIC BRAKE ACTUATOR CONTROLLER

BACKGROUND

The subject matter disclosed herein generally relates to an electric brake actuator controller and, more particularly, to force feedback fault detection and accommodation for the electric brake actuator controller.

Modern aircraft utilize electric motors in a multitude of applications; pumps, compressors, actuators, starters, etc. Many of these applications require the relatively sensitive drive electronics be located in an environmentally controlled electronic equipment bay. In contrast, the electric motor is remotely located elsewhere on the airframe. Often a significant distance exists between the drive electronics and the electric motor located elsewhere in the airframe. The reliability of this type of architecture is dependent on the airframe harnessing and its ability to deliver the signals between the drive electronics and the motor.

One such system is an aircraft's electric brake (eBrake) that can include four or even eight actuators that are driven by a single drive electronic component such as an electric brake actuator controller (EBAC). The eBrake and the EBAC can be separated by roughly 100 feet of harness. Due to the number or parts and distance between them, failure detection of a fault that occurs at one of the actuators or in the harnessing can be difficult to detect accurately. Accordingly, there is a need to provide a system and method for improving the detection of system faults.

BRIEF DESCRIPTION

According to one embodiment a method of fault detection and accommodation for a controller and actuator system is provided. The method includes receiving, from a controller, a flag at an actuator in response to an excitation voltage and current falling below a threshold value, engaging a sensor in the actuator in response to receiving the flag, receiving, using the sensor a first load cell signal and a second load cell signal in response to the sensor being engaged, determining how actuator is operating brake based on the received flag, first load cell signal, and second load cell signal, adjusting a state of the actuator based on the determination, and reporting the state of the actuator by transmitting a report signal to the controller.

In addition to one or more of the features described above, or as an alternative, further embodiments may include receiving an excitation voltage and current at the actuator, and transmitting a response excitation voltage and current back to the controller.

In addition to one or more of the features described above, or as an alternative, further embodiments may include receiving the flag at the actuator that includes generating the excitation voltage and current at the controller, transmitting the excitation voltage and current from the controller to the actuator, receiving a response excitation voltage and current from the actuator at the controller, comparing the response excitation voltage and current against an expected voltage and current threshold value, generating a flag when the response excitation voltage and current is below the expected voltage and current threshold value, and transmitting the flag to the actuator.

In addition to one or more of the features described above, or as an alternative, further embodiments may include wherein the first load cell signal is a low side voltage signal, and wherein the second load cell signal is a high side voltage signal.

In addition to one or more of the features described above, or as an alternative, further embodiments may include wherein adjusting the state of the actuator based on the determination includes adjusting the state from a normal state to a control state in response to the flag being greater than a flag current threshold value, the first load cell signal being greater than a measured value threshold, and the second load cell signal being greater than the measured value threshold, and adjusting the state from the control state to the normal state in response to the flag being less than the flag current threshold value, the first load cell signal being less than or equal to the measured value threshold, and the second load cell signal being less than or equal to the measured value threshold.

In addition to one or more of the features described above, or as an alternative, further embodiments may include wherein adjusting the state of the actuator based on the determination includes adjusting the state from a normal state to an accommodate state in response to the flag being greater than a flag current threshold value, the first load cell signal being between a first measured value threshold and a second measured value threshold, and the second load cell signal being between the first measured value threshold and the second measured value threshold, and adjusting the state from the accommodate state to the normal state in response to the flag being less than a flag current threshold value, the first load cell signal being less than or equal to the first measured value threshold, and the second load cell signal being less than or equal to the measured value threshold.

In addition to one or more of the features described above, or as an alternative, further embodiments may include wherein adjusting the state of the actuator based on the determination includes adjusting the state from a control state to an accommodate state in response to the flag being greater than a flag current threshold value, the first load cell signal being between a first measured value threshold and a second measured value threshold, and the second load cell signal being between the first measured value threshold and the second measured value threshold, and adjusting the state from the accommodate state to the control state in response to the flag being greater than a flag current threshold value, the first load cell signal being greater than the second measured value threshold, and the second load cell signal being greater than the second measured value threshold.

In addition to one or more of the features described above, or as an alternative, further embodiments may include wherein the controller is an electric brake actuator controller (EBAC), wherein the actuator is an electric brake actuator (EBA), wherein the EBAC is connected to the actuator through a harnessing, and wherein the harnessing includes a wire harness, a junction box, and a wire bundle assembly (WBA).

In addition to one or more of the features described above, or as an alternative, further embodiments may include wherein the controller and actuator system includes a plurality of actuators connected to the controller.

According to one embodiment a system for fault detection and accommodation is provided. The system includes a controller including a control processor that generates and transmits a flag and a storage medium that stores the flag, and a plurality of actuators connected to the controller using a harnessing, wherein each of the plurality of actuators includes at least one sensor, and wherein the plurality of actuators are configured to receive the flag in response to an excitation voltage and current falling below a threshold value, receive a first load cell signal and a second load cell signal using the at least one sensor, determine and adjust a state of the plurality of actuators based on the flag, the first load cell signal, and the second load cell signal, and report the state of the actuator to the controller.

In addition to one or more of the features described above, or as an alternative, further embodiments may include wherein the controller is an electric brake actuator controller (EBAC), wherein the plurality of actuators are each electric brake actuators (EBA), wherein the EBAC is connected to the plurality of EBAs through the harnessing, and wherein the harnessing includes a wire harness, a junction box, and a wire bundle assembly (WBA).

According to one embodiment a computer program product for fault detection and accommodation in a controller and an actuator system, the computer program product including a computer readable storage medium having program instructions embodied therewith is provided. The program instructions executable by a processor cause the processor to receive, from a controller, a flag at an actuator in response to an excitation voltage and current falling below a threshold value, engage a sensor in the actuator in response to receiving the flag, receive, using the sensor a first load cell signal and a second load cell signal in response to the sensor being engaged, determine how actuator is operating brake based on the received flag, first load cell signal, and second load cell signal, adjust a state of the actuator based on the determination, and report the state of the actuator by transmitting a report signal to the controller.

In addition to one or more of the features described above, or as an alternative, further embodiments may include additional program instructions stored in the computer readable storage medium and executable by the processor to cause the processor to receive an excitation voltage and current at the actuator, and transmit a response excitation voltage and current back to the controller.

In addition to one or more of the features described above, or as an alternative, further embodiments may include additional program instructions stored in the computer readable storage medium and executable by the processor to cause the processor to generate the excitation voltage and current at the controller, transmit the excitation voltage and current from the controller to the actuator, receive a response excitation voltage and current from the actuator at the controller, compare the response excitation voltage and current against an expected voltage and current threshold value, generate a flag when the response excitation voltage and current is below the expected voltage and current threshold value, and transmit the flag to the actuator.

In addition to one or more of the features described above, or as an alternative, further embodiments may include wherein the first load cell signal is a low side voltage signal, and wherein the second load cell signal is a high side voltage signal.

In addition to one or more of the features described above, or as an alternative, further embodiments may include additional program instructions stored in the computer readable storage medium and executable by the processor to cause the processor to adjust the state from a normal state to a control state in response to the flag being greater than a flag current threshold value, the first load cell signal being greater than a measured value threshold, and the second load cell signal being greater than the measured value threshold, and adjust the state from the control state to the normal state in response to the flag being less than the flag current threshold value, the first load cell signal being less than or equal to the measured value threshold, and the second load cell signal being less than or equal to the measured value threshold.

In addition to one or more of the features described above, or as an alternative, further embodiments may include additional program instructions stored in the computer readable storage medium and executable by the processor to cause the processor to adjust the state from a normal state to an accommodate state in response to the flag being greater than a flag current threshold value, the first load cell signal being between a first measured value threshold and a second measured value threshold, and the second load cell signal being between the first measured value threshold and the second measured value threshold, and adjust the state from the accommodate state to the normal state in response to the flag being less than a flag current threshold value, the first load cell signal being less than or equal to the first measured value threshold, and the second load cell signal being less than or equal to the measured value threshold.

In addition to one or more of the features described above, or as an alternative, further embodiments may include additional program instructions stored in the computer readable storage medium and executable by the processor to cause the processor to adjust the state from a control state to an accommodate state in response to the flag being greater than a flag current threshold value, the first load cell signal being between a first measured value threshold and a second measured value threshold, and the second load cell signal being between the first measured value threshold and the second measured value threshold, and adjust the state from the accommodate state to the control state in response to the flag being greater than a flag current threshold value, the first load cell signal being greater than the second measured value threshold, and the second load cell signal being greater than the second measured value threshold.

In addition to one or more of the features described above, or as an alternative, further embodiments may include wherein the controller is an electric brake actuator controller (EBAC), wherein the actuator is an electric brake actuator (EBA), wherein the EBAC is connected to the actuator through a harnessing, and wherein the harnessing includes a wire harness, a junction box, and a wire bundle assembly (WBA).

In addition to one or more of the features described above, or as an alternative, further embodiments may include wherein the controller and actuator system includes a plurality of actuators connected to the controller.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 2:
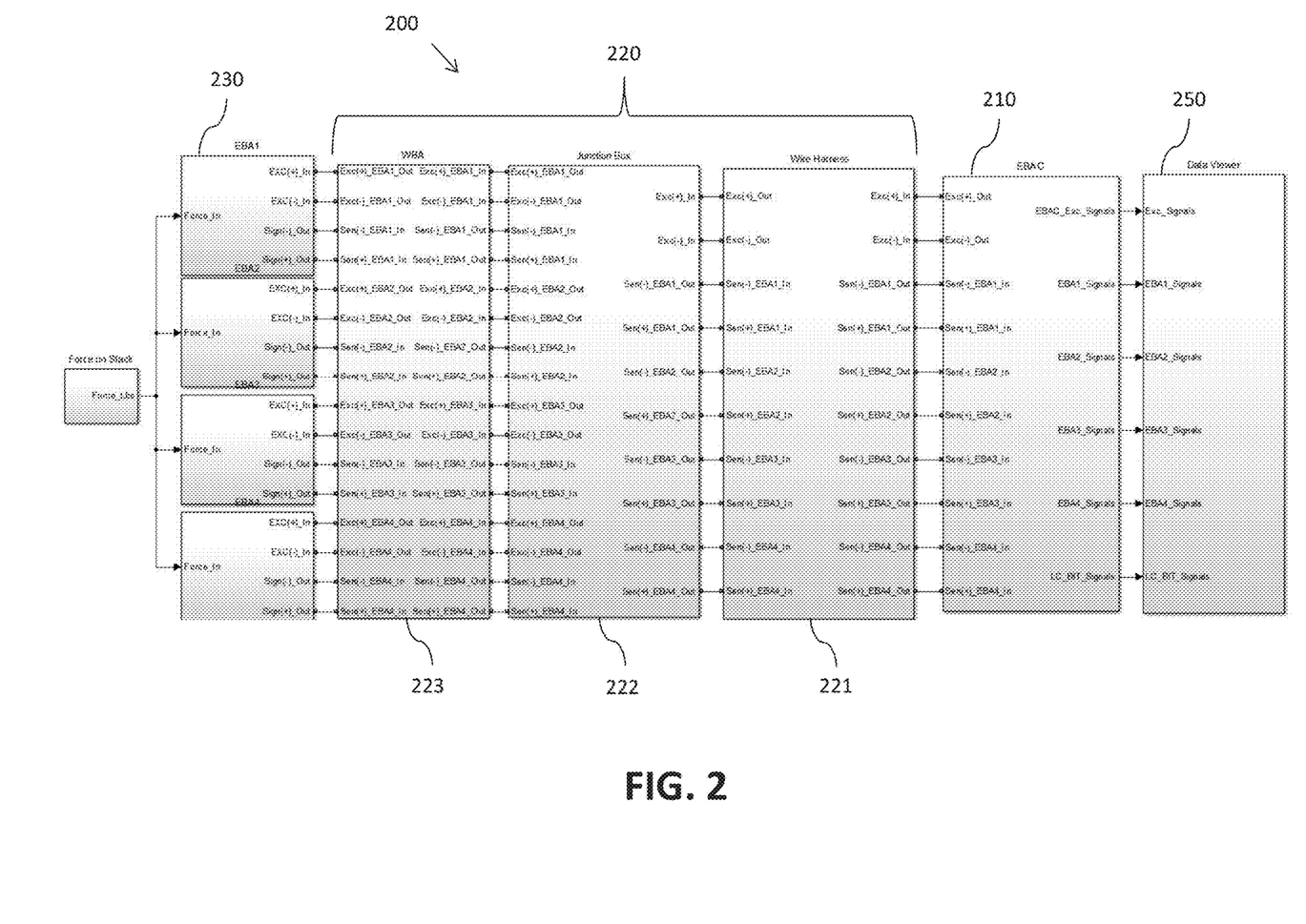
FIG. 2 depicts a block diagram of an electric brake system of an aircraft that includes a controller and actuators in accordance with one or more embodiments of the present disclosure.

Embodiments described herein are directed to a system and method that may help effectively detect and compensate for aircraft wiring faults within a controller and actuator system in order to increase dispatch reliability and reduce customer impact during a faulted condition. For example, one such system is an aircraft electric brake (eBrake) which includes an electric brake actuator controller (EBAC), aircraft wiring, a wire bundle assembly (WBA), and four or more electric brake actuators (EBA), as shown in FIG. 2.

Figure 1A:
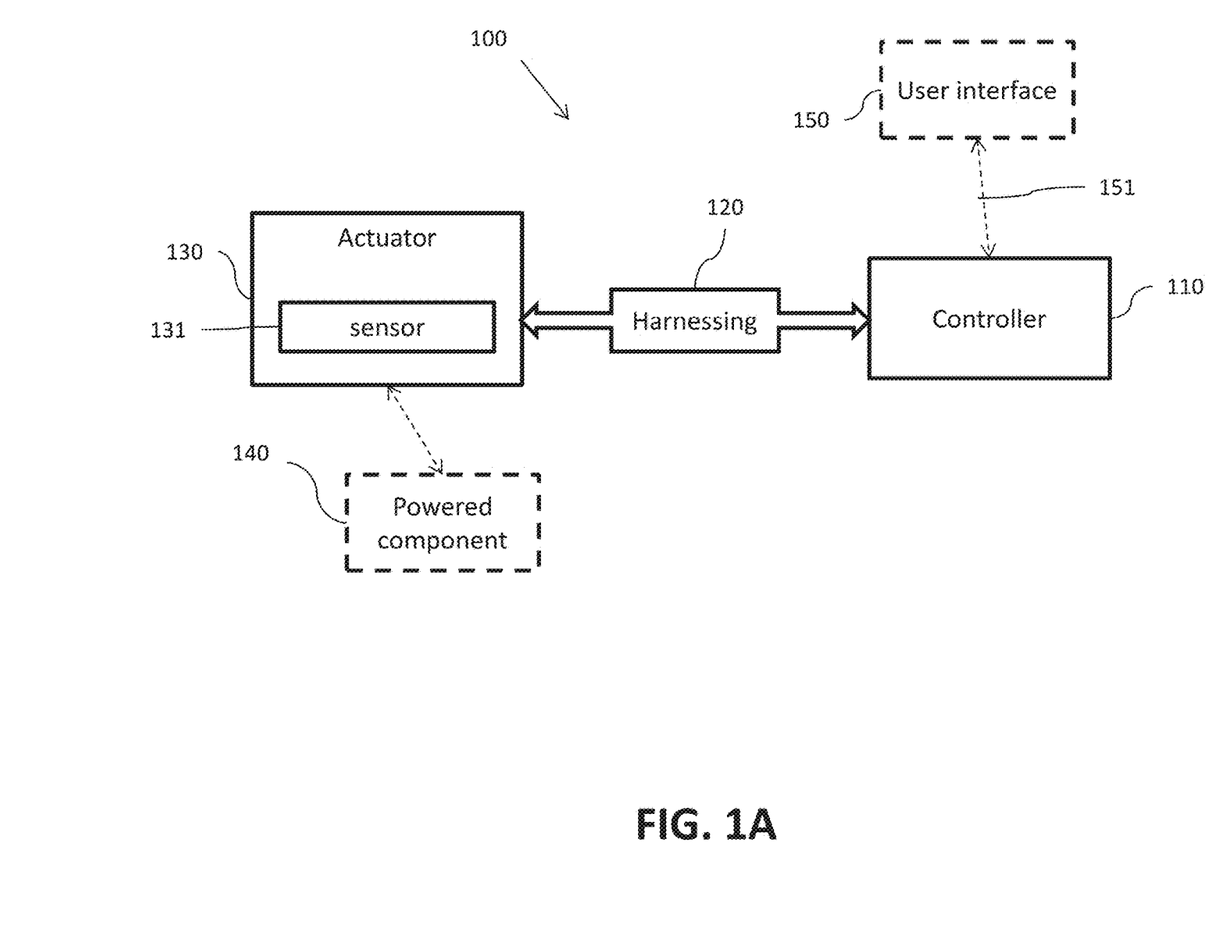
FIG. 1A depicts a block diagram of a controller and actuator system in accordance with one or more embodiments of the present disclosure.

Turning now to FIG. 1A, a block diagram of a controller and actuator system 100 in accordance with one or more embodiments of the present disclosure is shown. The system 100 includes a controller 110 that is connected to at least one actuator 130. The controller 110 is connected to the actuator 130 by a harnessing 120. The harnessing 120 electrically and communicatively connects the controller 110 and actuator 130. The actuator 130 can further include a sensor 131. The controller 110 is able to generate and transmit signals to the actuator 130 which returns its own signals to the controller 110. The returned signals from the actuator 130 can be adjusted based on the feedback received from a connected component 140. Accordingly, the value of the returned signal can be used to derive information about how the actuator is powering the component 140. Further, the sensor 131 in the actuator 130 can collect data that provides further details and information relating to the powered component 140 and the actuator 130. The collected data from the sensor 131 and the feedback values and the adjusted voltage and current signals can all be transmitted back to the controller 110 which can aggregate and analyze these signals to determine what is going on in the system 100 and then can generate a flag signal. For example, according to one embodiment, the flag is set after a transmitted excitation current is sent out and then a returned excitation current is received that has dropped below a certain current threshold that indicates a flag should be transmitted. The flag signal can be transmitted to the actuator 130 which can use the flag to adjust and control the component 140 in accordance with the controller's 110 analyzed understanding of the current state of the system.

Additionally, according to one or more embodiments, the system 100 may include a user interface 150 that is connected to the controller 110 through a wired or wireless connection 151. The user interface is configured to display any collected data or signals received at or generated by the controller 110. For example, the user interface 150 can display the returned voltage and current from the actuator 130 along with any sensor signals received from the sensor 131. Additionally, the user interface 150 can display the initially transmitted signals sent from the controller 110 to the actuator 130. Further, the user interface 150 can receive and transmit user input to the controller 110. The controller 110 can in turn process the user input to determine what if any commands that user would like implemented.

Figure 1B:
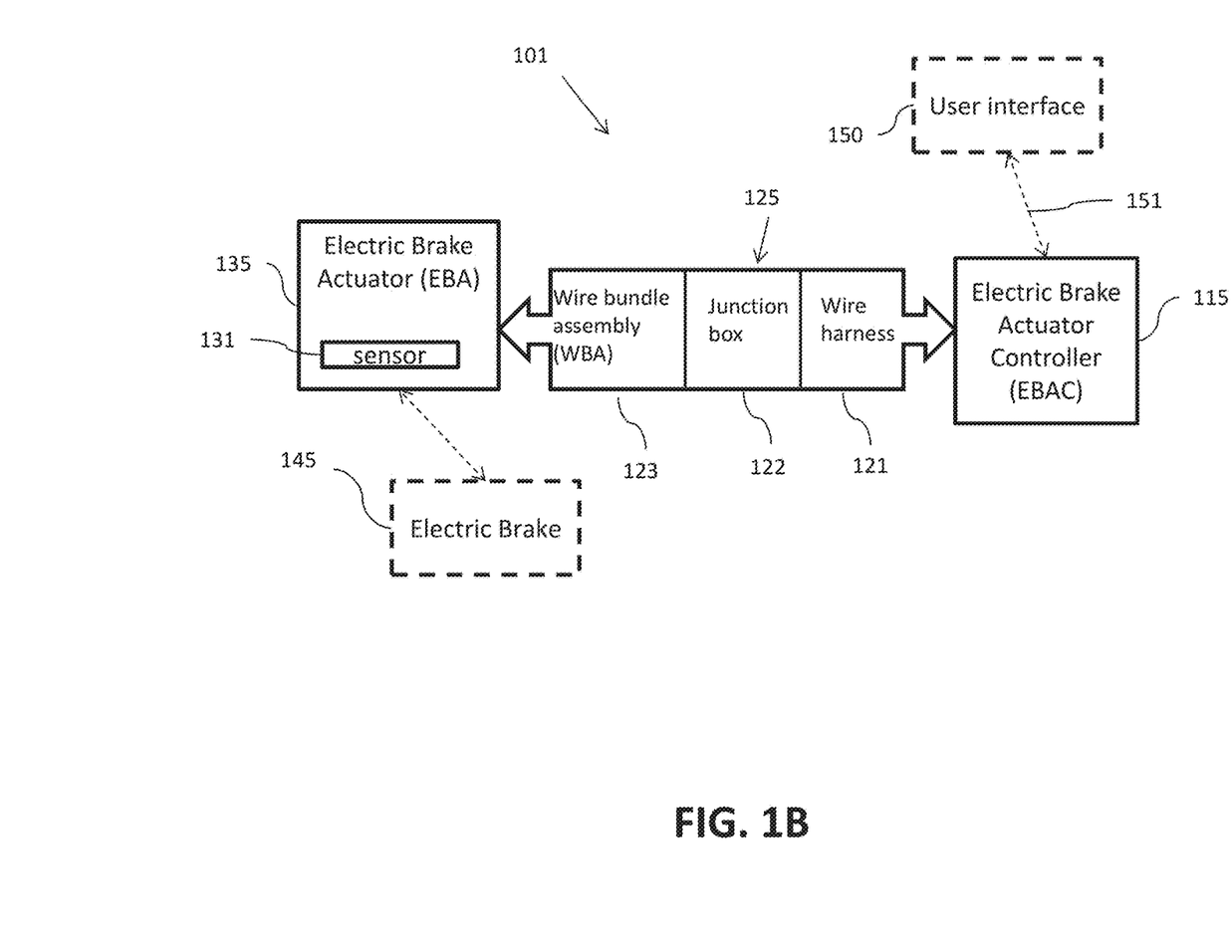
FIG. 1B depicts a block diagram of a system with an electric brake actuator controller (EBAC) and electric brake actuator (EBA) in accordance with one or more embodiments of the present disclosure.

FIG. 1B depicts a block diagram of a system 101 with an electric brake actuator controller (EBAC) 115 and an electric brake actuator (EBA) 135 in accordance with one or more embodiments of the present disclosure.

Specifically, the system 101 includes the electric brake actuator controller (EBAC) 115 that is connected to at least one electric brake actuator (EBA) 135. The electric brake actuator controller (EBAC) 115 is connected to the EBA 135 by a harnessing 125. The harnessing 125 electrically and communicatively connects the EBAC 115 and EBA 135. The harnessing 125 specifically includes a wire harness 121, a junction box 122, and a wire bundle assembly (WBA) 123.

Further, the EBA 135 can further include a sensor 131. The EBAC 115 is able to generate and transmit signals to the EBA 135 which returns its own signals to the EBAC 115. The returned signals from the EBA 135 can be adjusted based on the feedback received from a connected electric brake 145. For example, the a signal that defines the braking force in pounds can be received from the electric brake 145 at the EBA 135. Accordingly, the value of the returned signal can be used to derive information about how the EBA 135 is powering the electric brake 145. Further, the sensor 131 in the EBA 135 can collect data that provides further details and information relating to the electric brake 145 and the EBA 135. The collected data from the sensor 131 and the feedback values and the adjusted voltage and current signals can all be transmitted back to the EBAC 115 which can aggregate and analyze these signals to determine what is going on in the system 101 and then can generate a flag signal. For example, according to one embodiment, the flag is generated and set after a transmitted excitation current is sent out and then a returned excitation current is received that has dropped below a certain current threshold that indicates a flag should be transmitted. The flag signal can be transmitted to the EBA 135 which can use the flag to adjust and control the electric engine 145 in accordance with the EBAC's 115 analyzed understanding of the current state of the system 101.

Additionally, according to one or more embodiments, the system 101 may include a user interface 150 that is connected to the EBAC 115 through a wired or wireless connection 151. The user interface is configured to display any collected data or signals received at or generated by the EBAC 115. For example, the user interface 150 can display the returned voltage and current from the EBA 135 along with any sensor signals received from the sensor 131.

Additionally, the user interface 150 can display the initially transmitted signals sent from the EBAC 115 to the EBA 135. Further, the user interface 150 can receive and transmit user input to the EBAC 115. The EBAC 115 can in turn process the user input to determine what if any commands that user would like implemented. For example, the EBAC 115 can receive the user desired brake value that defines how much braking force the user would like the electric brake 145 to apply to the aircraft within which the system 101 is located.

FIG. 2 depicts a block diagram of an electric brake system 200 of an aircraft that includes a controller EBAC 210 and multiple EBA actuators 230 in accordance with one or more embodiments of the present disclosure. As shown, the system 200 includes a data viewer 250 that is substantially similar to the user interfaces of FIGS. 1A and 1B. The system 200 also includes a harnessing 220 that includes a wire harness 221, a junction box 222, and a wire bundle assembly (WBA) 223. The harnessing connected the EBAC 210 and the plurality of EBAs 230. Further, a number of signals can be transmitted through the system between the EBAC and EBAs as shown.

Figure 3:
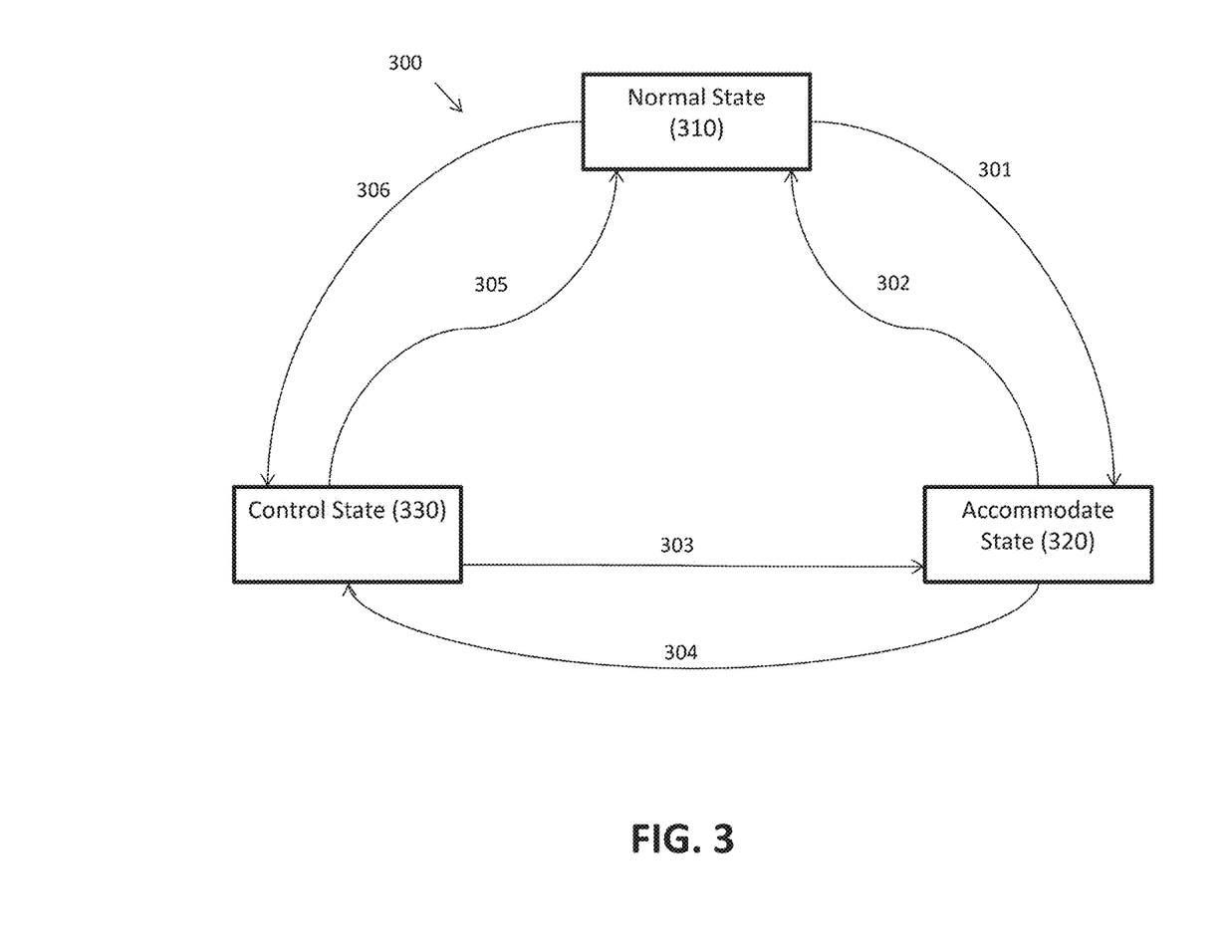
FIG. 3 depicts a block diagram of a state diagram in accordance with one or more embodiments of the present disclosure.

FIG. 3 depicts a block diagram of a state diagram 300 in accordance with one or more embodiments of the present disclosure. The state diagram includes three states which the system can be in. Specifically, the system may be in a normal state 310, an accommodate state 320, and a control state 330. Specifically, adjusting the state of an actuator of the system is based on a determination and collected signals. For example, adjusting the state from a normal state to a control state is done in response to a flag being greater than a flag current threshold value, a first load cell signal being greater than a measured value threshold, and a second load cell signal being greater than the measured value threshold (operation 306). Further, adjusting the state from the control state back to the normal state is done in response to the flag being less than the flag current threshold value, the first load cell signal being less than or equal to the measured value threshold, and the second load cell signal being less than or equal to the measured value threshold (operation 305).

According to one or more embodiments, adjusting the state from a normal state to an accommodate state is done in response to the flag being greater than a flag current threshold value, the first load cell signal being between a first measured value threshold and a second measured value threshold, and the second load cell signal being between the first measured value threshold and the second measured value threshold (operation 301). Further, adjusting the state from the accommodate state back to the normal state is done in response to the flag being less than a flag current threshold value, the first load cell signal being less than or equal to the first measured value threshold, and the second load cell signal being less than or equal to the measured value threshold (operation 302).

Further, according to one or more embodiments, adjusting the state from a control state to an accommodate state is done in response to the flag being greater than a flag current threshold value, the first load cell signal being between a first measured value threshold and a second measured value threshold, and the second load cell signal being between the first measured value threshold and the second measured value threshold (operation 303). Further, adjusting the state from the accommodate state to the control state is done in response to the flag being greater than a flag current threshold value, the first load cell signal being greater than the second measured value threshold, and the second load cell signal being greater than the second measured value threshold (operation 304).

Figure 4:
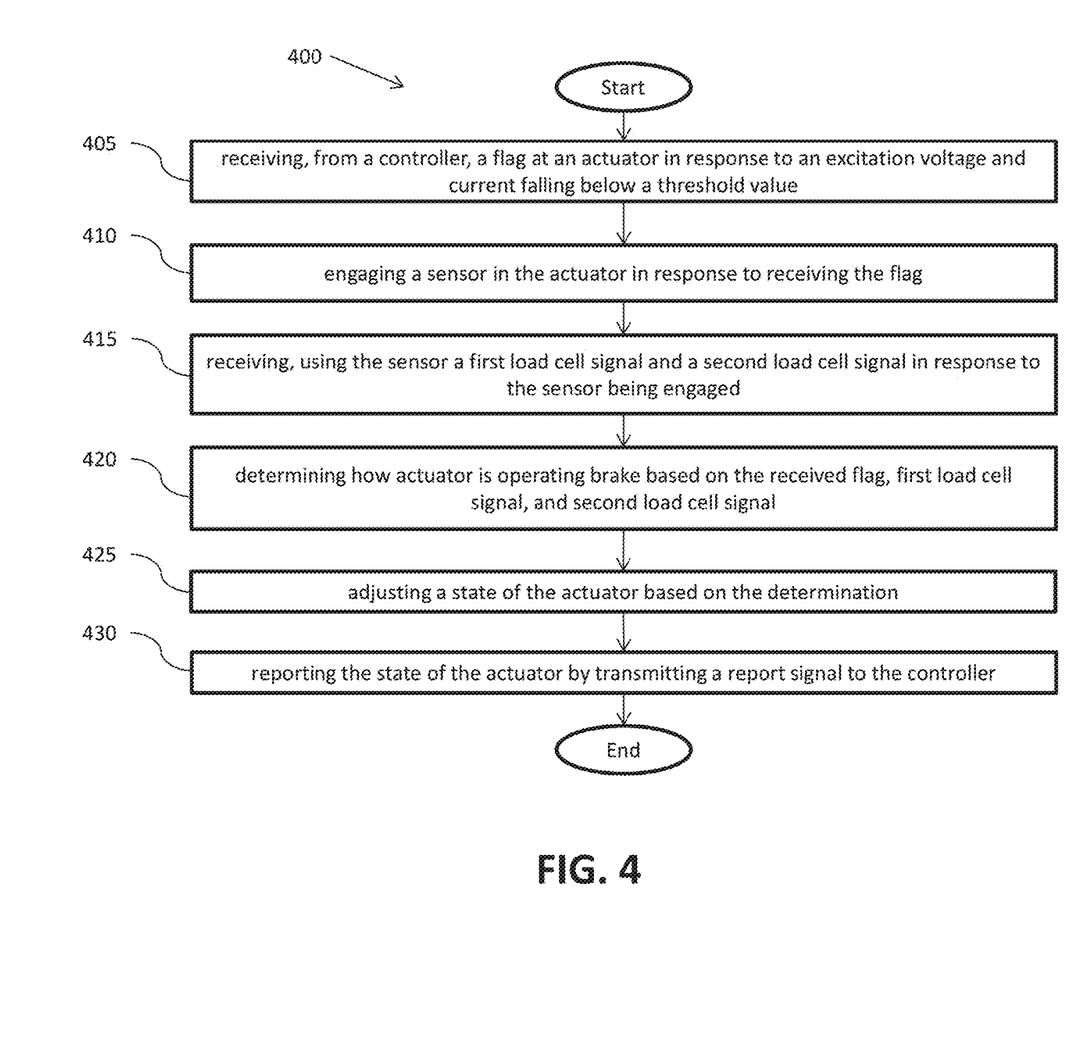
FIG. 4 depicts a method of fault detection and accommodation for a controller and actuator system in accordance with one or more embodiments of the present disclosure.

FIG. 4 depicts a method 400 of fault detection and accommodation for a controller and actuator system in accordance with one or more embodiments of the present disclosure. The method 400 includes receiving, from a controller, a flag at an actuator in response to an excitation voltage and current falling below a threshold value (operation 405). The method 400 also includes engaging a sensor in the actuator in response to receiving the flag (operation 410). Further, the method 400 includes receiving, using the sensor a first load cell signal and a second load cell signal in response to the sensor being engaged (operation 415) and determining how actuator is operating brake based on the received flag, first load cell signal, and second load cell signal (operation 420). The method 400 also includes adjusting a state of the actuator based on the determination (operation 425) and reporting the state of the actuator by transmitting a report signal to the controller (operation 430).

Figure 5:
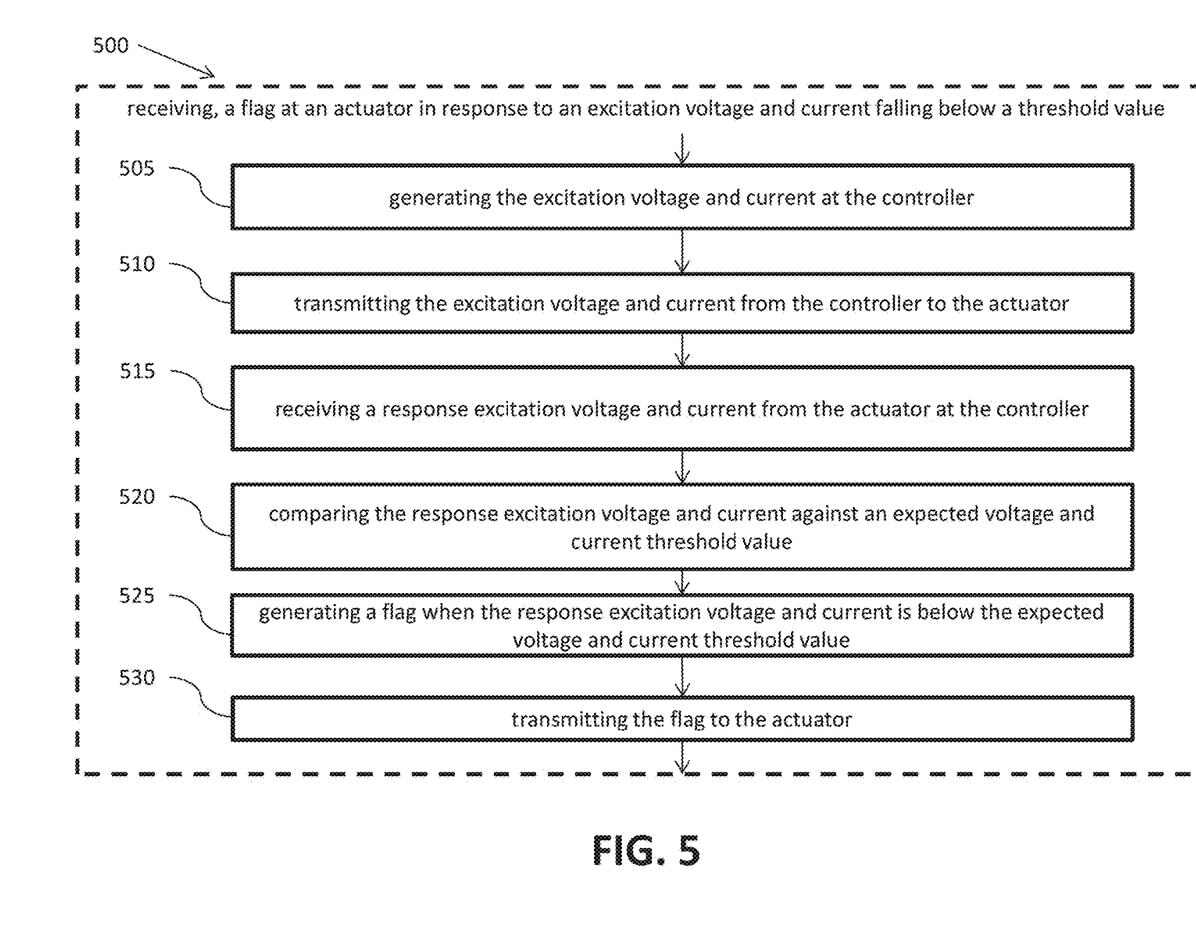
FIG. 5 depicts additional operations for a particular portion of a method of fault detection and accommodation for a controller and actuator system in accordance with one or more embodiments of the present disclosure.

FIG. 5 depicts additional operations for a particular portion of a method 500 of fault detection and accommodation for a controller and actuator system in accordance with one or more embodiments of the present disclosure. The particular portion of the method 500 includes generating the excitation voltage and current at the controller (operation 505) and transmitting the excitation voltage and current from the controller to the actuator (operation 510). The particular portion of the method 500 also includes receiving a response excitation voltage and current from the actuator at the controller (operation 515) and comparing the response excitation voltage and current against an expected voltage and current threshold value (operation 520). Further, the particular portion of the method 500 includes generating a flag when the response excitation voltage and current is below the expected voltage and current threshold value (operation 525), and transmitting the flag to the actuator (operation 530).

According to one or more embodiments, the method 400 may further include receiving an excitation voltage and current at the actuator. Additionally, the method 400 may further include transmitting a response excitation voltage and current back to the controller. Further, according to another embodiment, the first load cell signal is a low side voltage signal, and the second load cell signal is a high side voltage signal.

According to one or more embodiments, the controller used in the method 400 as shown in FIG. 4 may be an electric brake actuator controller (EBAC). Further, the actuator may be an electric brake actuator (EBA), the EBAC may be connected to the actuator through a harnessing, and the harnessing can include a wire harness, a junction box, and a wire bundle assembly (WBA). Further, according to an embodiments, the controller and actuator system comprises a plurality of actuators connected to the controller.

According to one or more embodiments, a control loop within an EBAC may depend on several analog signals being received from the EBAs which can be transferred across nearly 100$ft$ of aircraft wiring in some cases. For example, one of these signals may be a load cell force feedback whose magnitude is single millivolts full scale.

According to one or more embodiments, in a normal state, a straight differential load cell feedback signal may be acceptable to use which is a typical operating state of a controller. If an interface becomes degraded via a shunt or series impedance, an excitation current flag may be set and a single ended measurements shifts up past a threshold which moves the control into an accommodation mode. In the accommodate mode the state machine calculates a gain correction of a differential feedback to reduce a force error applied by an actuator. If a load cell interface is degraded to a level of which the signal to noise ratio becomes problematic, the state machine switches to an alternate control state which reduces performance yet maintains function of a safety critical system.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of fault detection and accommodation for a controller and actuator system, wherein the actuator system includes an actuator and having a sensor and controls operation of an electric brake, the method comprising:
   generating and transmitting from the controller to the actuator a controller excitation current;
   receiving at the controller a signal from the actuator system, the signal including a measured excitation current measured by the sensor;
   setting a flag in the controller in response to the measured excitation current falling below a threshold value;
   transmitting a flag signal after the flag is set, the flag signal being transmitted from the controller to control circuitry on the actuator;
   receiving from the electric brake at the control circuitry on the actuator a first and second load cell signals that are based on a braking force applied by the electric brake;
   determining at the control circuitry on the actuator how the actuator is operating the electric brake based on the first and second load signals wherein determining includes comparing the first and second load cell signals to expected first and second load cell signals;
   adjusting a state of the actuator based on determining how the actuator is operating and transmitting the state to the controller;
   adjust a state of the actuator in the controller based on the determination, wherein adjusting the state includes calculating a gain correction to be applied to the controller excitation current to reduce a force error of the actuator; and
   operating the controller with the corrected gain.

2. The method of claim 1,
   wherein the controller is an electric brake actuator controller (EBAC),
   wherein the actuator is an electric brake actuator (EBA),
   wherein the EBAC is connected to the actuator through a harnessing, and
   wherein the harnessing comprises a wire harness, a junction box, and a wire bundle assembly (WBA).

3. The method of claim 1,
   wherein the controller and actuator system comprises a plurality of actuators connected to the controller.

* * * * *